Feb. 2, 1971  H. G. NICKEL  3,559,322

DISPLAY DEVICE

Filed July 25, 1968

Inventor
Hal G. Nickel
By Joseph A. Genovese
Attorney

United States Patent Office 3,559,322
Patented Feb. 2, 1971

3,559,322
DISPLAY DEVICE
Hal G. Nickel, Brookfield, Wis., assignor to Display Corporation, Milwaukee, Wis., a corporation of Wisconsin
Filed July 25, 1968, Ser. No. 747,728
Int. Cl. G09f 7/00
U.S. Cl. 40—129                                      8 Claims

ABSTRACT OF THE DISCLOSURE

A display device includes a display support plate affixed to a column which extends upwardly from a base. A copy or indicia bearing member is mounted on the support plate.

The support base is adjustable to fit beneath a standing vehicle tire and the column extends at an angle to the base such that the entire weight of the column and support plate creates a moment urging the base into engagement with the vehicle tire which supports the entire device.

BACKGROUND OF THE INVENTION

(I) Field of the invention

This invention relates to point of purchase displays and, more particularly, to displays which can be used with standing vehicles or the like.

(II) Description of the prior art

It has been proposed to display specifications and advertising material for individual vehicle models in different ways such as self-supporting tables or stands, hanging displays from the ceiling, taping materials to the vehicle windows or setting the materials on the vehicle. These prior proposals have generally been deficient in that they obstruct the view of the entire vehicle, interfere with the observer's movement about the vehicle and/or are cumbersome and inconvenient to install.

SUMMARY OF THE INVENTION

A general object of this invention is to provide a simple point-of-purchase display in the immediate proximity of a standing vehicle without interfering with the observer's inspection of the vehicle. A further object is to provide for a simple installation and breakdown of the display device.

For achievement of these and other objects, this invention proposes that a member bearing copy or other printed indicia thereon be supported by a support plate affixed to a column connected to and extending upwardly from a support base. The support base is generally U-shaped and adjustable to fit beneath a standing vehicle tire such that the entire display device creates a moment urging the base into engagement with the tire thus facilitating the support of the device by the tire.

The display material is thus immediately before an observer of the vehicle and yet does not interfere with a thorough inspection of the vehicle. The display device is also quick and easy to install.

DESCRIPTION OF THE PREFERRED EMBODIMENT

This invention will probably find particular application in connection with point-of-purchase vehicle displays but it is appreciated that it may have wider application.

Figure 1:
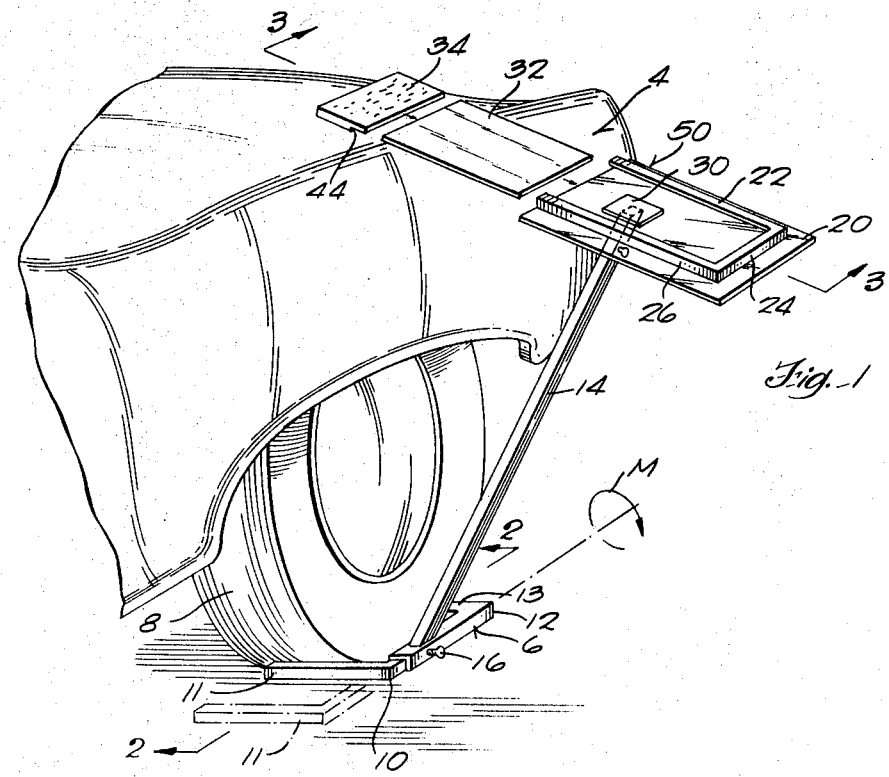
FIG. 1 is an exploded view of a display device and associated with a vehicle embodying this invention.

A point-of-purchase display and, more particularly the wheel supported feature display in a vehicle display room is comprised of a display support 4, a support column 14 and a base 6. The base is adjustable to fit beneath and be supported by tire 8 of a standing vehicle, only a portion of which is shown in FIG. 1.

The adjustable base 6 is generally U-shaped and structurally includes two L-shaped members 10 and 12 which are preferably rectangular in cross section and hollow. One of the members, member 10 has a smaller cross section than the other, member 12. With this construction member 10 telescopes within member 12 and thereby provides the means by which the base is adjustable.

Figure 2:
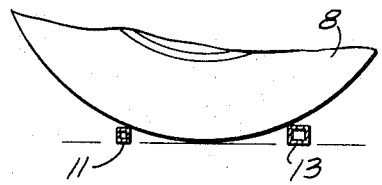
FIG. 2 is a section view generally along line 2—2 of FIG. 1.
Figure 3:
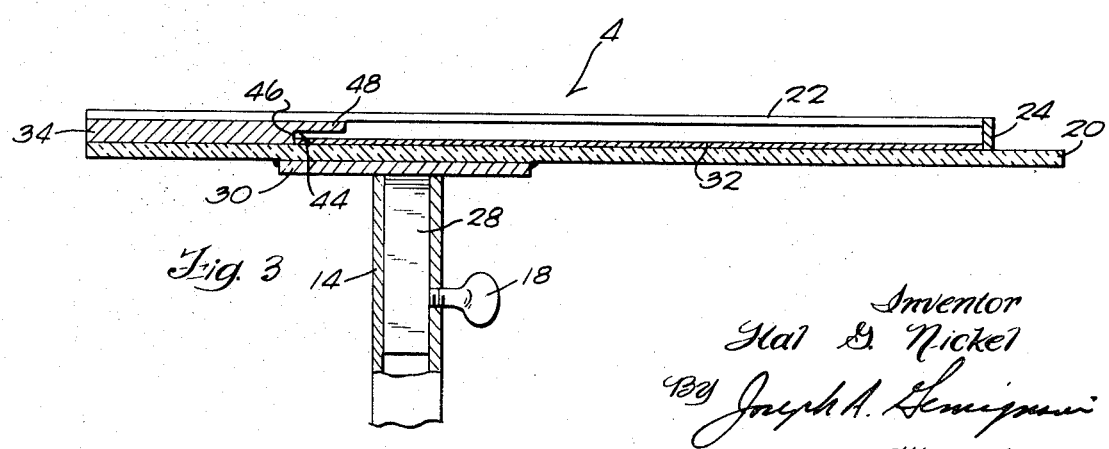
FIG. 3 is a fragmentary sectional view of the upper portion of the display device and generally along line 3—3 of FIG. 1 but with the header and specification card inserted.

The telescoped portions of members 10 and 12 form the web of the U-shaped base. Legs 11 and 13 are separated for insertion under the tire and members 10 and 12 are then adjusted to fit legs 11 and 13 snugly under tire 8 as illustrated in FIG. 2. Thumbscrew 16 is affixed to member 12 and is tightened to hold members 10 and 12, and correspondingly, legs 11 and 13, in their adjusted position.

Column 14 is preferably hollow with a rectangular cross section and has its lower end permanently affixed to L-shaped member 12 in a conventional manner, for example by a weld. Column 14 extends vertically upward from base 6 at an oblique angle to the plane of the base for a purpose which will be explained more fully hereinafter.

Display support 4 is comprised of a plate 20 of any conventional material such as glass or a transparent plastic. A plate 30 is affixed by an adhesive to the under side of plate 20 and is generally centered on plate 20. Post 28 is welded to and projects from the exposed side of plate 30. Post 28 has a cross section complimentary to that of column 14, in this instance rectangular, and is telescoped into column 14. Thumbscrew 18 affixed to column 14 will hold post 28 in any adjusted position.

The display support 4 further includes a U-shaped frame 50 affixed by an adhesive to the upper side of support plate 20. The U-shaped frame 50 is comprised of three sections 22, 24 and 26 each of which has an L-shaped cross section. One leg of each section is affixed to the support plate and the other overlies, but is spaced from, the upper side of plate 30. Specification card 32 can be inserted into frame 50 through the open end thereof and slides beneath sections 22, 24 and 26. Header 34 closes the open end of the frame and holds the specification card 32 in frame 50. Structurally, header 34 is rectangular in shape and dimensioned to fit into frame 50. Specifically, the header extends between the vertical legs of sections 22 and 26 and fits beneath the horizontal legs thereof. Notch 44 is provided at the inner end of the header thereby forming a shoulder 46 which engages the upper edge of the specification card and a lip 48 which overlies the upper edge. With this arrangement the specification card is readily inserted on and removed from the display device, and is securely held in the device by the combination frame and header.

The particular configuration of the display device is such that when adjustable base 6 is adajusted beneath vehicle tire 8 and with column 14 extending angularly therefrom and carrying the display support above the base, the weight of the entire display device excepting the base 6 creates a moment M acting about the base 6. The moment tends to rotate base 6 about the web of the base which urges the base into firm engagement with tire 8 thereby assuring the suport of the entire display device.

Although but one embodiment of the present invention has been illustrated and described, it will be apparent to those skilled in the art that various changes and modifications may be made therein without departing from the spirit of the invention or from the scope of the appended claims.

What is claimed is:

1. A display device comprising, in combination,
a generally U-shaped base, including a column connected to said base said column extending upwardly and outwardly from said base at an oblique angle thereto,
a display support,
said display support including means bearing printed indicia thereon,
and means connecting said display support to said column at a point spaced vertically and outwardly from said base so that said base, column and display support are arranged to create a moment about said base when said device is upright and said display device will be held upright by the interaction of said base with a standing unit engaging said base.

2. The combination according to claim 1 wherein said combination further includes a vehicle tire comprising said standing unit,
said generally U-shaped base consists of two L-shaped members, and
one of the L-shaped members telescopes within the other to form said generally U-shaped base for sliding adjustment therebetween so that said base can be adjusted to fit on both sides of and under said tire.

3. The display device of claim 1 wherein said display support is comprised of
a support plate,
a post affixed to and projecting from the underside of said support plate,
said post and said column having sliding telescoped engagement therebetween,
and means for securing said post and column in a preselected relative position.

4. The display device of claim 3
including means defining a U-shaped frame attached to the top side of said plate for receiving and holding said indicia bearing means on said plate.

5. The display device of claim 4 including a header releasably engaged in said frame and engaging said indicia bearing means to hold said indicia bearing means in said frame.

6. The display device of claim 5 wherein
said U-shaped frame comprises generally L-shaped sections each having one leg thereof connected to said top side of said support surface and a second leg overlying and spaced from said top side,
said U-shaped frame having an open end,
said indicia bearing means comprising a card releasably received in said frame between said second frame section legs and said top side,
and wherein said header is disposed at said open frame end and is releasably received between said second frame section legs and said top side, said header engaging an edge of said card and including means defining a lip overlying said card edge so that said card is held in said frame.

7. The display device of claim 1,
wherein said generally U-shaped base comprises two L-shaped members,
wherein one of the said L-shaped members telescopes within the other member for sliding adjustment so that said base is adjustable to fit under a vehicle tire,
said column being attached to one of said L-shaped members,
said display support including a support plate and a post affixed to and projecting from the underside of said support plate,
said post and said column having sliding telescoping engagement therebetween and means for securing said post and column in a preselected relative position,
said support plate including means defining a U-shaped frame attached to the top side of said plate for receiving and holding said indicia bearing means on said plate,
and said support plate also includes a header releasably engaged in said frame and securing said indicia bearing means in said U-shaped frame.

8. In a display device,
a base including a first horizontal portion adapted to be inserted beneath the tire of a standing vehicle with said first portion engaging a part of said tire,
a column connected to and extending angularly upwards from the base and arranged to project outwardly from said vehicle tire when said base is engaged under said tire,
and a display support, means connecting said display support to said column at a point spaced vertically and outwardly from said base so that when said device is in an upright position the weight of said support and column produces a moment about said base urging said base into engagement with said standing vehicle tire to support said display device in an upright position.

References Cited

UNITED STATES PATENTS

| 2,459,928 | 1/1949 | Edwards | 40—125HX |
| 3,141,253 | 7/1964 | Bartram | 116—173X |
| 3,330,247 | 7/1967 | Gunderson | 40—125HX |

JEROME SCHNALL, Primary Examiner

W. J. CONTRERAS, Assistant Examiner